US009756331B1

(12) United States Patent
Grange et al.

(10) Patent No.: US 9,756,331 B1
(45) Date of Patent: Sep. 5, 2017

(54) ADVANCE CODED REFERENCE PREDICTION

(71) Applicant: Google Inc., Mountain View, CA (US)

(72) Inventors: Adrian William Grange, Los Gatos, CA (US); Yaowu Xu, Sunnyvale, CA (US); Jim Bankoski, Los Gatos, CA (US); Paul Gordon Wilkins, Milton (GB); John Koleszar, Mountain View, CA (US); Francis William Galligan, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 767 days.

(21) Appl. No.: 13/919,741

(22) Filed: Jun. 17, 2013

(51) Int. Cl.
*H04N 7/50* (2006.01)
*H04N 19/50* (2014.01)

(52) U.S. Cl.
CPC .............................. *H04N 19/00569* (2013.01)

(58) Field of Classification Search
CPC ... H04N 19/61; H04N 19/52; H04N 19/00569
USPC .......................... 375/E7.211, 240.12, E7.133
See application file for complete search history.

(56) References Cited

U.S. PATENT DOCUMENTS

| | | | |
|---|---|---|---|
| 4,816,906 A | 3/1989 | Kummerfeldt et al. |
| 4,924,310 A | 5/1990 | von Brandt |
| 5,148,269 A | 9/1992 | de Haan et al. |
| 5,337,086 A | 8/1994 | Fujinami |
| 5,371,841 A | 12/1994 | Jones |
| 5,389,068 A | 2/1995 | Keck |
| 5,398,068 A | 3/1995 | Liu et al. |
| 5,442,458 A | 8/1995 | Rabbani et al. |
| 5,461,423 A | 10/1995 | Tsukagoshi |
| 5,483,287 A | 1/1996 | Siracusa |
| 5,485,279 A | 1/1996 | Yonemitsu et al. |
| 5,512,952 A | 4/1996 | Iwamura |
| 5,568,200 A | 10/1996 | Pearistein et al. |

(Continued)

FOREIGN PATENT DOCUMENTS

| | | |
|---|---|---|
| EP | 0634873 | 1/1995 |
| EP | 1351510 | 10/2003 |

(Continued)

OTHER PUBLICATIONS

Written Opinion of the International Searching Authority dated Apr. 20, 2010 from the corresponding International Application No. PCT/US2009/056448 filed Sep. 10, 2009.

(Continued)

*Primary Examiner* — Mohammed Rahaman
*Assistant Examiner* — Fabio Lima
(74) *Attorney, Agent, or Firm* — Young Basile Hanlon & MacFarlane, P.C.

(57) ABSTRACT

Encoding and decoding using advance coded reference prediction may include identifying a sequence of temporally adjacent frames from the plurality of frames, wherein each frame in the sequence of temporally adjacent frames is associated with a respective frame position indicating a temporal location the sequence, encoding a first frame from the sequence as an intra-coded frame, generating an alternate reference frame by reconstructing the first encoded frame, encoding a second frame from the sequence with reference to a reference frame, the second frame associated with a second frame position, including the first encoded frame in a compressed bitstream at a first bitstream position, and including the second encoded frame in the compressed bitstream at a second bitstream position, wherein the second bitstream position is later than the first bitstream position and wherein the first frame position is later than the second frame position.

16 Claims, 9 Drawing Sheets

(56) References Cited

U.S. PATENT DOCUMENTS

| | | | |
|---|---|---|---|
| 5,576,767 A | 11/1996 | Lee et al. |
| 5,586,285 A | 12/1996 | Hasbun et al. |
| 5,686,962 A | 11/1997 | Chung et al. |
| 5,717,394 A | 2/1998 | Schwartz et al. |
| 5,731,840 A | 3/1998 | Kikuchi et al. |
| 5,748,789 A | 5/1998 | Lee et al. |
| 5,767,909 A | 6/1998 | Jung |
| 5,818,536 A | 10/1998 | Morris et al. |
| 5,886,742 A | 3/1999 | Hibi et al. |
| 5,912,676 A | 6/1999 | Malladi et al. |
| 5,926,226 A | 7/1999 | Proctor et al. |
| 5,991,447 A | 11/1999 | Eifrig et al. |
| 5,999,641 A | 12/1999 | Miller et al. |
| 6,005,980 A | 12/1999 | Eifrig et al. |
| 6,075,875 A | 6/2000 | Gu |
| 6,084,912 A | 7/2000 | Reitmeier et al. |
| 6,108,383 A | 8/2000 | Miller et al. |
| 6,115,076 A | 9/2000 | Linzer |
| 6,181,822 B1 | 1/2001 | Miller et al. |
| 6,222,174 B1 | 4/2001 | Tullis et al. |
| 6,236,682 B1 | 5/2001 | Ota et al. |
| 6,272,179 B1 | 8/2001 | Kadono |
| 6,289,049 B1 | 9/2001 | Kim et al. |
| 6,292,837 B1 | 9/2001 | Miller et al. |
| 6,327,304 B1 | 12/2001 | Miller et al. |
| 6,359,929 B1 | 3/2002 | Boon |
| 6,370,267 B1 | 4/2002 | Miller et al. |
| 6,381,277 B1 | 4/2002 | Chun et al. |
| 6,473,463 B2 | 10/2002 | Agarwal |
| 6,560,366 B1 | 5/2003 | Wilkins |
| 6,658,618 B1 | 12/2003 | Gu et al. |
| 6,661,842 B1 | 12/2003 | Abousleman |
| 6,711,211 B1 | 3/2004 | Lainema |
| 6,735,249 B1 | 5/2004 | Karczewicz et al. |
| 6,774,929 B1 | 8/2004 | Kopp |
| 6,909,749 B2 | 6/2005 | Yang et al. |
| 6,985,527 B2 | 1/2006 | Gunter et al. |
| 7,027,654 B1 | 4/2006 | Ameres et al. |
| 7,050,503 B2 | 5/2006 | Prakash et al. |
| 7,085,319 B2 | 8/2006 | Prakash et al. |
| 7,221,710 B2 | 5/2007 | Lee |
| 7,253,831 B2 | 8/2007 | Gu |
| 7,406,053 B2 | 7/2008 | Cheung et al. |
| 7,430,261 B2 | 9/2008 | Forest et al. |
| 7,499,492 B1 | 3/2009 | Ameres et al. |
| 7,529,199 B1 | 5/2009 | Wijnands et al. |
| 7,532,808 B2 | 5/2009 | Lainema |
| 7,606,310 B1 | 10/2009 | Ameres |
| 7,671,894 B2 | 3/2010 | Yea et al. |
| 7,728,840 B2 | 6/2010 | Hung |
| 7,734,821 B2 * | 6/2010 | Wang .................... G10L 19/005 348/387.1 |
| 7,773,677 B2 | 8/2010 | Lee |
| 7,974,233 B2 | 7/2011 | Banerjee |
| 8,005,137 B2 | 8/2011 | Han et al. |
| 8,111,752 B2 | 2/2012 | Kumar |
| 8,284,846 B2 | 10/2012 | Lamy-Bergot et al. |
| 8,310,521 B2 | 11/2012 | Zhang et al. |
| 8,638,854 B1 | 1/2014 | Bankoski et al. |
| 9,014,266 B1 | 4/2015 | Gu et al. |
| 2001/0022815 A1 | 9/2001 | Agarwal |
| 2002/0031272 A1 | 3/2002 | Bagni et al. |
| 2002/0036705 A1 | 3/2002 | Lee et al. |
| 2002/0071485 A1 | 6/2002 | Caglar et al. |
| 2002/0118295 A1 * | 8/2002 | Karczewicz ..... H04N 21/23424 348/384.1 |
| 2002/0172289 A1 | 11/2002 | Akiyoshi et al. |
| 2003/0081850 A1 | 5/2003 | Karczewicz et al. |
| 2003/0123545 A1 | 7/2003 | Prakash et al. |
| 2003/0165331 A1 | 9/2003 | Van Der Schaar |
| 2003/0202594 A1 | 10/2003 | Lainema |
| 2003/0215014 A1 | 11/2003 | Koto et al. |
| 2004/0013308 A1 | 1/2004 | Jeon et al. |
| 2004/0037357 A1 | 2/2004 | Bagni et al. |
| 2004/0042549 A1 | 3/2004 | Huang et al. |
| 2004/0080669 A1 | 4/2004 | Nagai et al. |
| 2004/0184533 A1 | 9/2004 | Wang |
| 2004/0202252 A1 | 10/2004 | Lee |
| 2004/0228410 A1 | 11/2004 | Ameres et al. |
| 2005/0008240 A1 | 1/2005 | Banerji et al. |
| 2005/0031030 A1 | 2/2005 | Kadono et al. |
| 2005/0123056 A1 | 6/2005 | Wang et al. |
| 2005/0147167 A1 | 7/2005 | Dumitras et al. |
| 2005/0185045 A1 | 8/2005 | Kamariotis |
| 2005/0207490 A1 | 9/2005 | Wang et al. |
| 2005/0226321 A1 | 10/2005 | Chen |
| 2005/0259736 A1 | 11/2005 | Payson |
| 2005/0286629 A1 | 12/2005 | Dumitras et al. |
| 2006/0050149 A1 | 3/2006 | Lang et al. |
| 2006/0050695 A1 | 3/2006 | Wang |
| 2006/0062481 A1 | 3/2006 | Suvanto |
| 2006/0098738 A1 | 5/2006 | Cosman et al. |
| 2006/0126734 A1 | 6/2006 | Wiegand et al. |
| 2006/0159174 A1 | 7/2006 | Chono |
| 2006/0198443 A1 | 9/2006 | Liang et al. |
| 2006/0285598 A1 | 12/2006 | Tulkki |
| 2007/0009034 A1 | 1/2007 | Tulkki |
| 2007/0019730 A1 | 1/2007 | Lee et al. |
| 2007/0092010 A1 | 4/2007 | Huang et al. |
| 2007/0109409 A1 | 5/2007 | Yea et al. |
| 2007/0130755 A1 | 6/2007 | Duquette et al. |
| 2007/0177665 A1 | 8/2007 | Zhou et al. |
| 2007/0199011 A1 | 8/2007 | Zhang |
| 2007/0201559 A1 | 8/2007 | He |
| 2007/0206673 A1 | 9/2007 | Cipolli et al. |
| 2007/0211798 A1 | 9/2007 | Boyce et al. |
| 2007/0230563 A1 | 10/2007 | Tian et al. |
| 2008/0112486 A1 | 5/2008 | Takahashi et al. |
| 2008/0115185 A1 | 5/2008 | Qiu et al. |
| 2008/0130755 A1 | 6/2008 | Loukas et al. |
| 2008/0219351 A1 | 9/2008 | Kim et al. |
| 2008/0273599 A1 | 11/2008 | Park et al. |
| 2008/0317138 A1 | 12/2008 | Jia |
| 2009/0103610 A1 | 4/2009 | Puri |
| 2009/0122859 A1 | 5/2009 | Yasuda |
| 2009/0147856 A1 | 6/2009 | Song et al. |
| 2009/0148058 A1 | 6/2009 | Dane et al. |
| 2009/0154563 A1 | 6/2009 | Hong et al. |
| 2009/0175330 A1 | 7/2009 | Chen et al. |
| 2009/0238269 A1 | 9/2009 | Pandit et al. |
| 2009/0238277 A1 * | 9/2009 | Meehan ................ H04N 19/124 375/240.16 |
| 2010/0061444 A1 * | 3/2010 | Wilkins ............ H04N 19/00006 375/240.02 |
| 2010/0061461 A1 * | 3/2010 | Bankoski ............. H04N 19/105 375/240.16 |
| 2010/0061645 A1 * | 3/2010 | Wilkins ................. H04N 19/50 382/238 |
| 2010/0086027 A1 | 4/2010 | Panchal et al. |
| 2010/0104016 A1 | 4/2010 | Aoki |
| 2010/0195721 A1 | 8/2010 | Wu et al. |
| 2010/0239015 A1 | 9/2010 | Wang et al. |
| 2011/0069751 A1 | 3/2011 | Budagavi |
| 2011/0090960 A1 | 4/2011 | Leontaris et al. |
| 2011/0164684 A1 | 7/2011 | Sato et al. |
| 2012/0063513 A1 * | 3/2012 | Grange ............ H04N 19/00575 375/240.13 |
| 2012/0189058 A1 | 7/2012 | Chen et al. |
| 2012/0257677 A1 | 10/2012 | Bankoski et al. |
| 2012/0328005 A1 | 12/2012 | Yu et al. |
| 2013/0022099 A1 | 1/2013 | Liu et al. |
| 2013/0044817 A1 | 2/2013 | Bankoski et al. |
| 2013/0279589 A1 | 10/2013 | Gu et al. |
| 2014/0169449 A1 | 6/2014 | Samuelsson et al. |

FOREIGN PATENT DOCUMENTS

| | | |
|---|---|---|
| EP | 1496706 | 1/2005 |
| GB | 2403618 | 1/2005 |
| JP | 8280032 | 10/1996 |
| JP | 11262018 | 9/1999 |
| JP | 11289544 | 11/1999 |
| JP | 11313332 | 11/1999 |

(56) References Cited

FOREIGN PATENT DOCUMENTS

| JP | 11513205 | 11/1999 |
|---|---|---|
| KR | 100213018 | 8/1999 |
| KR | 20010030916 | 4/2001 |
| KR | 1020080064355 A | 9/2008 |
| WO | WO0150770 | 7/2001 |
| WO | WO03026315 | 3/2003 |
| WO | 03084235 A1 | 10/2003 |
| WO | 2006078115 A1 | 7/2006 |
| WO | WO2006078115 | 7/2006 |
| WO | 2008008331 A2 | 1/2008 |
| WO | WO2011005624 A1 | 1/2011 |
| WO | WO2012102973 A1 | 8/2012 |

OTHER PUBLICATIONS

International Search Report dated Apr. 20, 2010 from the corresponding International Application No. PCT/US2009/056448.
"Series H: Audiovisual and Multimedia Systems; Infrastructure of audiovisual services—Coding of moving video; Advanced video coding for generic audiovisual services". H.264. Version 1. International Telecommunication Union. Dated May, 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 2007.
Zhi Liu, Zhaoyang Zhang, Liquan Shen, Mosiac Generation in H.264 Compressed Domain, IEEE 2006.
On2 Technologies, Inc. White Paper TrueMotion VP7 Video Codec, Jan. 10, 2005, 13 pages, Document Version 1.0, Clifton Park, New York.
On2 Technologies, Inc. White Paper ON2's TrueMotion VP7 Video Codec, Jul. 11, 2008, 7 pages, Document Version 1.0, Clifton Park, New York.
Liu, P., et al., "A fast and novel intra and inter modes decision prediction algorithm for H.264/AVC based-on the characteristics of macro-block", 2009 Fifth Intl. Confr. on Intelligent Information Hiding and Multimedia Signal Processing, pp. 286-289, httpP//ieeexplore.ieee.org/stamp/stamp.jsp?tp=&arnumber-5337483.
Bankoski et al. "Technical Overview of VP8, An Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Bo Hong: "Introduction to H264", Internet citation, XP002952898, pp. 5, 14-15, Nov. 22, 2002.
Carreira, Joao et al. "Constrained Parametric Min-Cuts for Automatic Object Segmentation", 2010 IEEE Conference on Computer Vision and Pattern Recognition (CVPR), San Francisco, CA, Jun. 13-18, 2010.
Hendry et al., "AHG21: Explicit Reference Pictures Signaling with Output Latency Count Scheme", 7 JCT-VC Meeting; 98 MPEG Meeting Nov. 21, 2011-Nov. 30, 2011; Geneva.
High efficiency video coding (HEVC) text specification draft 6, JCTVC-H1003, JCT-VC 7th meeting, Geneva, Switzerland, Nov. 21-30, 2011.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
International Search Report and Written opinion, from related matter, International Application No. PCT/US2009/056448.
"Liu, P., et al, ""A fast and novel intra and inter modes decision prediction algorithm for H.264/AVC based-on the characteristics of* u macro-block""", 2009 Fifth Inti. Confr. on Intelligent Information Hiding and Multimedia Signal Processing, pp. 286-289,http:/ /i eeexp lore. ieee .o rg/s tamp/stamp .jsp ?tp=&arn umber =533 7 483".
Mozilla, "Introduction to Video Coding Part 1: Transform Coding", Video Compression Overview, Mar. 2012, 171 pp.
Multi-core processor, Wikipedia, the free encyclopedia. Http://wikipedia.org/wiki/Multi-core_processor; dated Apr. 30, 2012.
On2 Technologies, Inc., White Paper On2's TrueMotion VP7 Video Codec,Jan. 10, 2005, pp. 13 pages, Document Version:1.0, Clifton Park, New York.
Park, Jun Sung, et al., "Selective Intra Prediction Mode Decision for H.264/AVC Encoders", World Academy of Science, Engineering and Technology 13, (2006).
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Sjoberg R. et al/ "Absolute signaling of refrence pictures", 6 JCT-VC Meeting; 97. MPEG Meeting; Jul. 14, 2011-Jul. 22, 2011; Torinino (Joint Collaborative Team on Video Coding of ISO/*EC JTC1/Sc29/WG11 and ITU-T SG. 16).
VP8 Data Format and Decoding Guide. WebM Project. Google On2. Dated: Dec. 1, 2010.
Irani M et al, "Video Compression Using Mosaic Representations", Signal Processing Image Communication, vol. 7 No. 4., pp. 529-552, Nov. 1, 1995.
Feng Wu et al, "Efficient Background Video Coding with Static Sprite Generation and Arbitrary-Shape Spatial Prediction Techniques", IEEE Transactions on Circuits and Systems for Video Technology, vol. 13, No. 5, pp. 394-405, May 1, 2003.
Hiroshi Watanabe et al, "Sprite Coding in Object-Based Video Coding Standard: MPEG-4", Proceedings of Multiconference on Systemics, Cybernetics and Informatics, vol. 13, pp. 420-425, Jul. 1, 2001.
Girod B. et al., "3-D Image Models and Compression: Synthetic Hybrid or Natural Fit?", International Conference on Image Processing, vol. 2, pp. 525-529, Oct. 24, 1999.
Borman S. et al., "Super-Resolution From Image Sequences—A Review", Proceedings of Midwest Symposium on Circuits and Systems, pp. 374-378, Aug. 9, 1998.
European Supplementary Search Report, EP09813575, Dated Oct. 23, 2012.
Athanasios, et al.,"Weighted prediction methods for improved motion compensation," Image Processing (ICIP), 2009 16th IEEE International Conference, Nov. 7, 2009, pp. 1029-1032.
Chen, Michael C., et al.; "Design and Optimization of a Differentially Coded Variable Block Size Motion Compensation System", IEEE 1996, 4 pp.

(56) References Cited

OTHER PUBLICATIONS

Then, Xing C., et al.; "Quadtree Based Adaptive Lossy Coding of Motion Vectors", IEEE 1996, 4 pp.
Chong Soon Lim et al. Reference Lists for B Pictures Under Low Delay Constraints, 95. MPEG Meeting; Jan. 24, 2011; Jan. 21, 2011.
Ebrahimi, Touradj, et al.; "Joint motion estimation and segmentation for very low bitrate video coding", SPIE vol. 2501, 1995, 12 pp.
EP127356814 Search Report mailed Dec. 30, 2014.
Fang S et al: "The Construction of Combined List for HEVC",6. JCT-VC Meeting; 97. MPEG Meeting; Jul. 14, 2011-Jul. 22, 2011;Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F573. Jul. 16, 2011 (Jul. 16, 2011).
Guillotel, Philippe, et al.; "Comparison of motion vector coding techniques", SPIE vol. 2308, 1994, 11 pp.
Karczewicz, Marta, et al.; "Video Coding Using Motion Compensation With Polynomial Motion Vector Fields", IEEE C0MSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp. (Abstract only).
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 25, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wang et al., On reference picture list construction for uni-predicted partitions, JCT-VC Meeting, JCTVCE348, MPEG Meeting, Geneva, Mar. 11, 2011.
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.

\* cited by examiner

ADVANCE CODED REFERENCE PREDICTION

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using advance coded reference prediction.

An aspect is a method for performing advance coded reference prediction, which may include identifying a sequence of temporally adjacent frames from the plurality of frames, wherein each frame in the sequence of temporally adjacent frames is associated with a respective frame position indicating a temporal location of the respective frame in the sequence of temporally adjacent frames, generating a first encoded frame by encoding a first frame from the sequence of temporally adjacent frames as an intra-coded frame, the first frame associated with a first frame position, generating an alternate reference frame by reconstructing the first encoded frame, generating a second encoded frame by encoding a second frame from the sequence of temporally adjacent frames with reference to at least one of a plurality of reference frames, the second frame associated with a second frame position, wherein the plurality of reference frames includes the alternate reference frame, including the first encoded frame in a compressed bitstream at a first bitstream position in the compressed bitstream, and including the second encoded frame in the compressed bitstream at a second bitstream position in the compressed bitstream, wherein the second bitstream position in the compressed bitstream is later than the first bitstream position in the compressed bitstream and wherein the first frame position is later than the second frame position.

Another aspect is a method for performing advance coded reference prediction, which may include receiving at least a portion of the video stream, wherein each encoded frame in the plurality of encoded frames is associated with a respective bitstream position indicating a position of the respective encoded frame in the compressed bitstream, and wherein the compressed bitstream represents a sequence of temporally adjacent video frames, wherein each frame in the sequence of temporally adjacent video frames is associated with a respective frame position indicating a temporal location of the respective frame in the sequence of temporally adjacent video frames, identifying a first encoded frame from the plurality of encoded frames, the first encoded frame associated with a first bitstream position, generating an alternate reference frame by decoding the first encoded frame as an intra-coded frame, wherein the alternate reference frame is associated with a first frame position, identifying a second encoded frame from the plurality of encoded frames, the second encoded frame associated with a second bitstream position, wherein the second bitstream position is later than the first bitstream position, generating a first decoded frame by decoding the second encoded frame with reference to at least one of a plurality of reference frames, the first decoded frame associated with a second frame position, wherein the plurality of reference frames includes the alternate reference frame, identifying a third encoded frame from the plurality of encoded frames, the third encoded frame associated with a third bitstream position, wherein the third bitstream position is later than the second bitstream position, generating a second decoded frame by decoding the third encoded frame with reference to the alternate reference frame, wherein the second decoded frame is associated with the first frame position, including the first decoded frame in an output video stream at a first output position; and including the second decoded frame in the output video stream at a second output position, wherein the second output position is later than the first output position, and wherein the first frame position is later than the second frame position.

Another aspect is a method for performing advance coded reference prediction, which may include receiving at least a portion of the video stream, wherein each encoded frame in the plurality of encoded frames is associated with a respective bitstream position indicating a position of the respective encoded frame in the compressed bitstream, and wherein the compressed bitstream represents a sequence of temporally adjacent video frames, wherein each frame in the sequence of temporally adjacent video frames is associated with a respective frame position indicating a temporal location of the respective frame in the sequence of temporally adjacent video frames identifying a first encoded frame from the plurality of encoded frames, the first encoded frame associated with a first bitstream position generating an alternate reference frame by decoding the first encoded frame as an intra-coded frame, wherein the alternate reference frame is associated with a first frame position identifying a second encoded frame from the plurality of encoded frames, the second encoded frame associated with a second bitstream position, wherein the second bitstream position is later than the first bitstream position generating a first decoded frame by decoding the second encoded frame with reference to at least one of a plurality of reference frames, the first decoded frame associated with a second frame position, wherein the plurality of reference frames includes the alternate reference frame identifying, in the compressed bitstream, a frame skip indicator associated with the first frame position including the first decoded frame in an output video stream at a first output position, and including the alternate reference frame in the output video stream at a second output position, wherein the second output position is later than the first output position, and wherein the first frame position is later than the second frame position.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources. Compression and other coding techniques may be used to reduce the amount of data in video streams.

Encoding a video stream, or a portion thereof, such as a frame or a block, can include using temporal and spatial similarities in the video stream to improve coding efficiency. For example, video coding may include predicting pixel values based on temporal and spatial similarities between pixels. One form of prediction is inter-prediction, which can include predicting values for a portion of a current frame based on one or more reference frames. In some implementations of prediction coding, one or more frames of a video sequence can be generated and transmitted out of temporal order for use in prediction coding. The efficiency of predictive video coding may depend on the degree of similarity between the current frame and the reference frame. For example, encoding a frame using a relatively similar reference frame may utilize fewer resources than encoding the frame using a less similar reference frame.

In some implementations of advance coded reference prediction, the last frame of a sequence of temporally adjacent frames may be encoded as an alternate reference frame and may be the first frame encoded from the sequence of temporally adjacent frames. The alternate reference frame may be encoded independently, without reference to another frame. A compressed bitstream generated for the sequence of temporally adjacent frames may indicate that the alternate reference frame is a keyframe and is an alternate reference frame. Frames in the sequence of temporally adjacent frames temporally preceding the alternate reference frame, and frames following the alternate reference frame in the input video sequence, may be encoded with reference to the alternate reference frame. In some implementations, a video coded using advance coded reference prediction can be decoded serially from the beginning of the video, and can be accessed at any point marked as a keyframe, such as an alternate reference frame.

Figure 1:
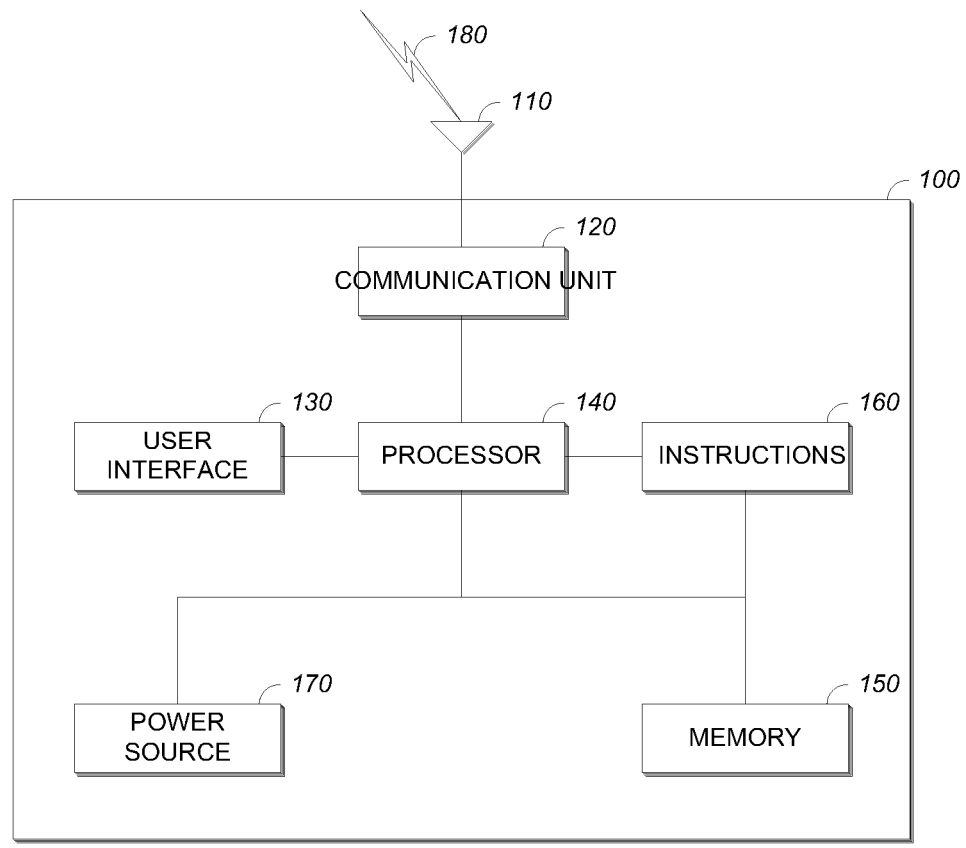
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
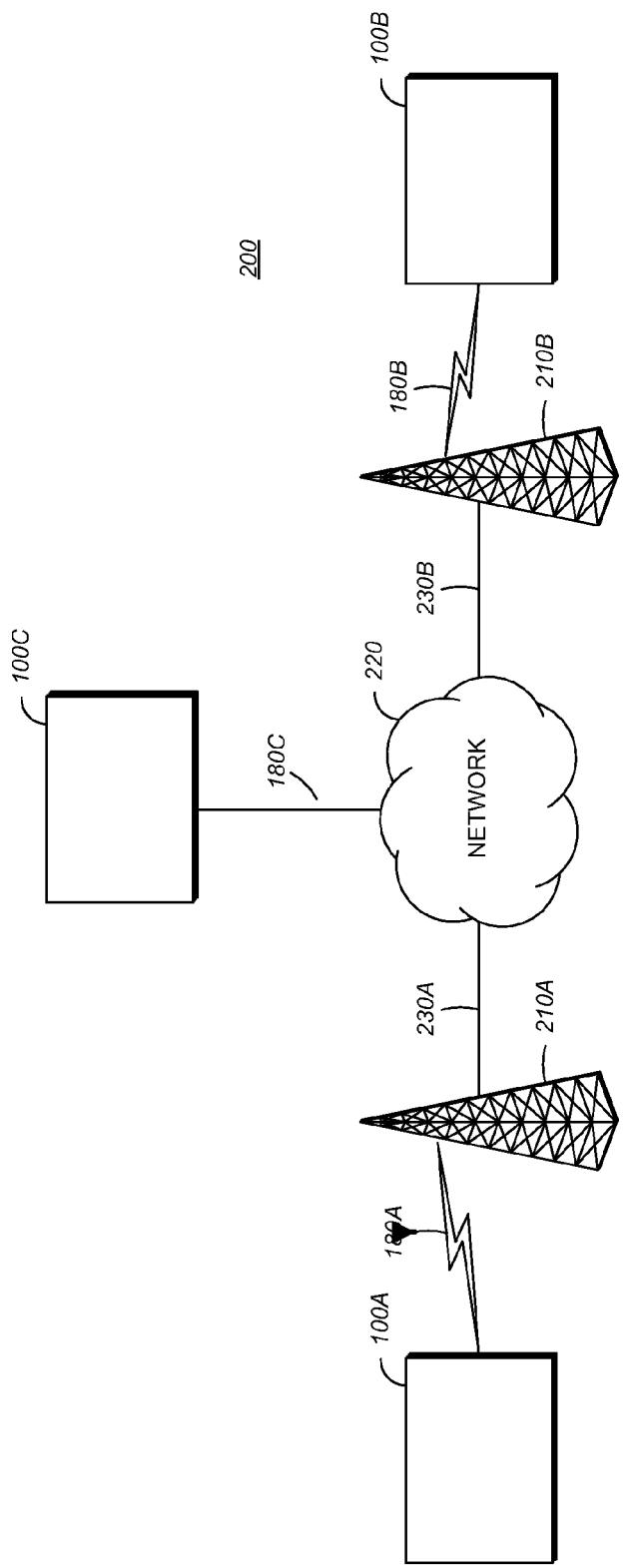
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
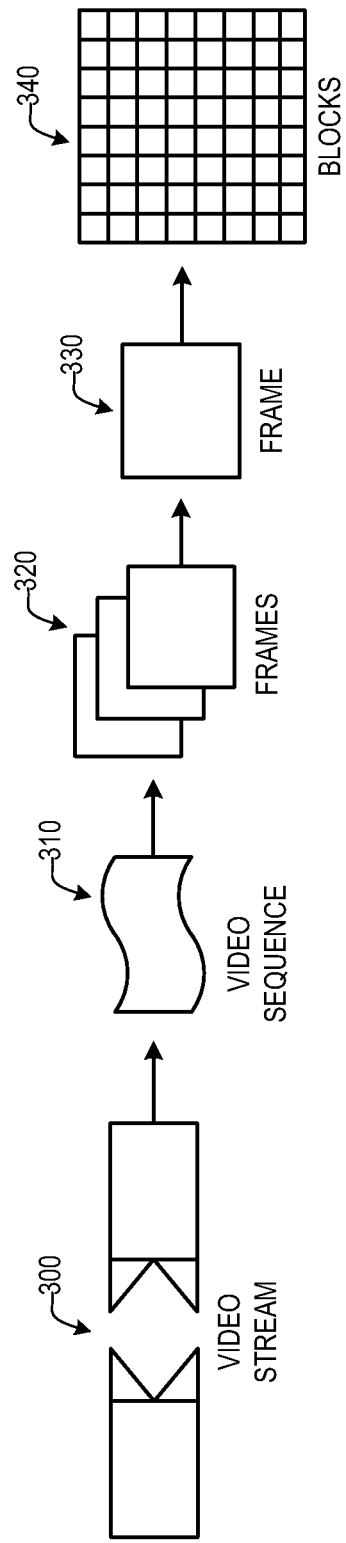
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
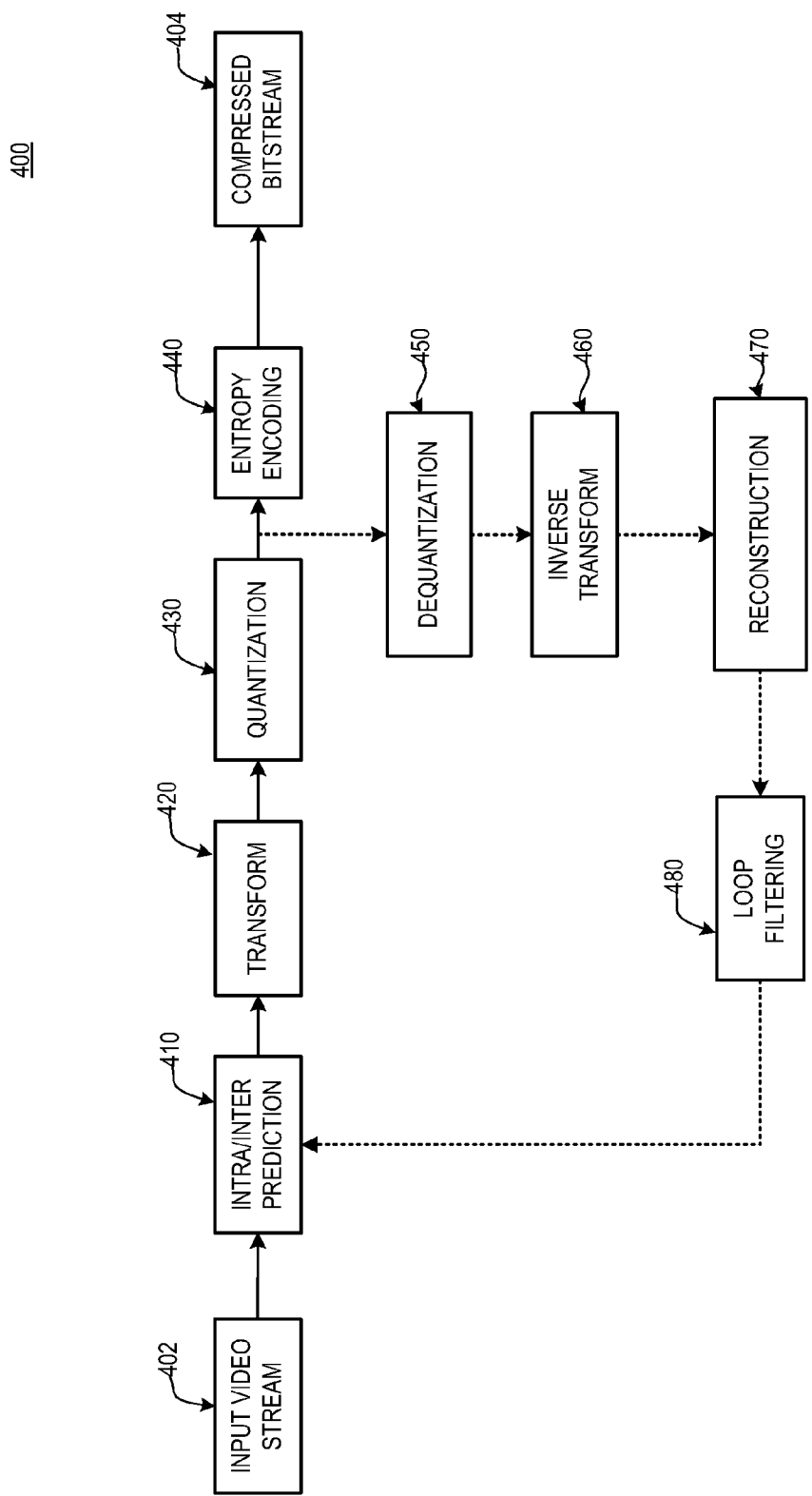
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
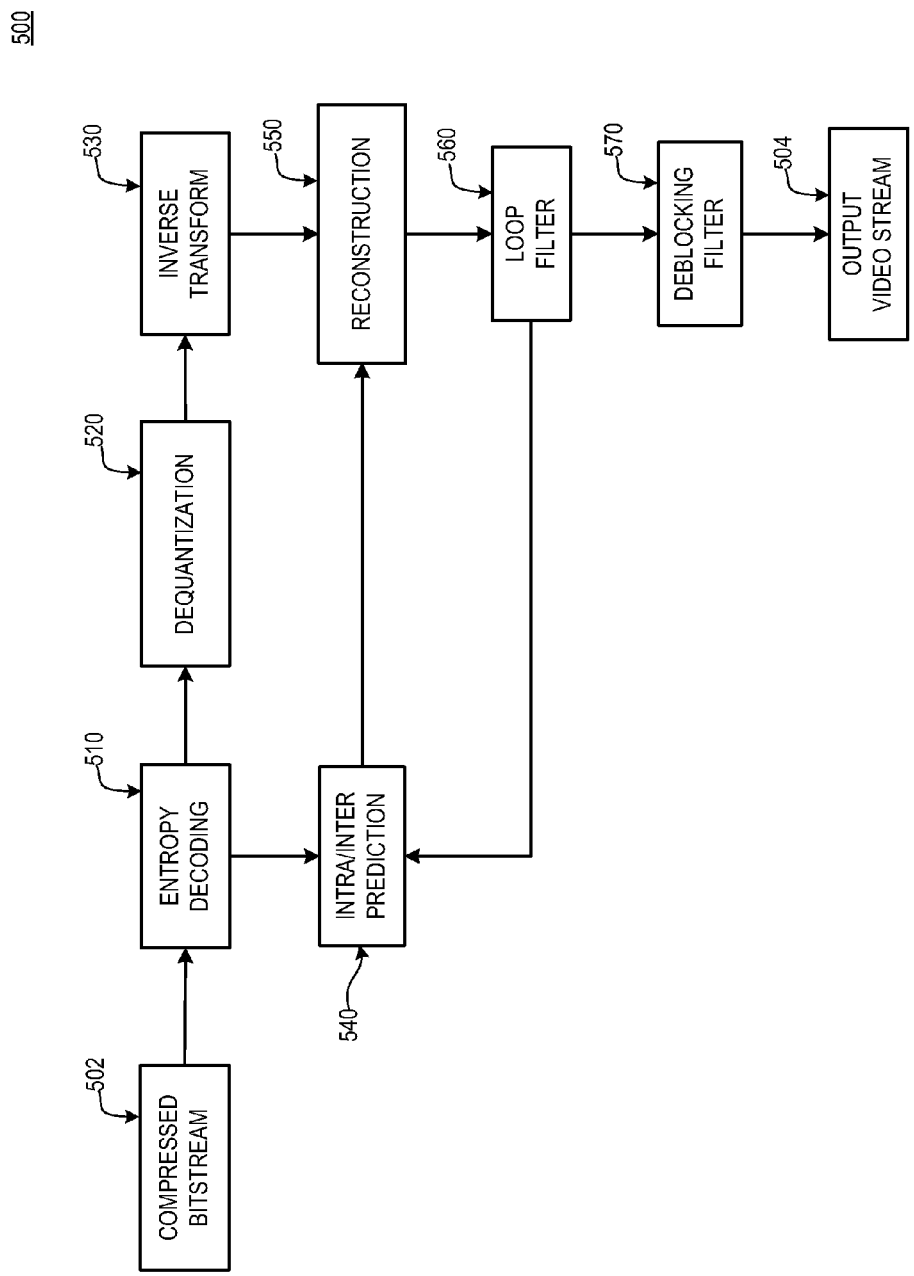
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
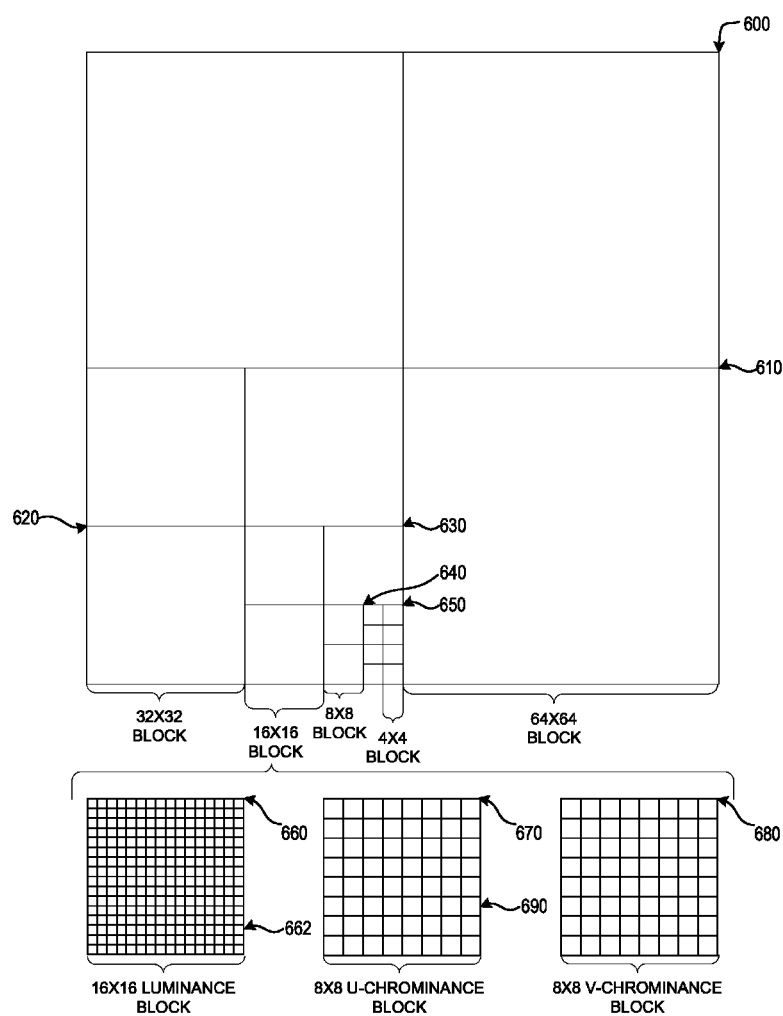
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, which may be referred to as superblocks, in two rows and two columns in a matrix or Cartesian plane. In some implementations, a superblock may be a basic or maximum coding unit. Each superblock may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the superblock in the top row and left column of a frame may be the first block coded and the superblock immediately to the right of the first block may be the second block coded. The second row from the top may be the second row coded, such that the superblock in the left column of the second row may be coded after the superblock in the rightmost column of the first row.

In some implementations, coding a block may include using quad-tree coding, which may include coding smaller block units with a block in raster-scan order. For example, the 64×64 superblock shown in the bottom left corner of the portion of the frame shown in FIG. 6, may be coded using quad-tree coding wherein the top left 32×32 block may be coded, then the top right 32xz32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although advance coded reference prediction is described herein with reference to matrix or Cartesian representation of a frame for clarity, a frame may be stored, transmitted, processed, or any combination thereof, in any data structure such that pixel values may be efficiently predicted for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

Figure 7:
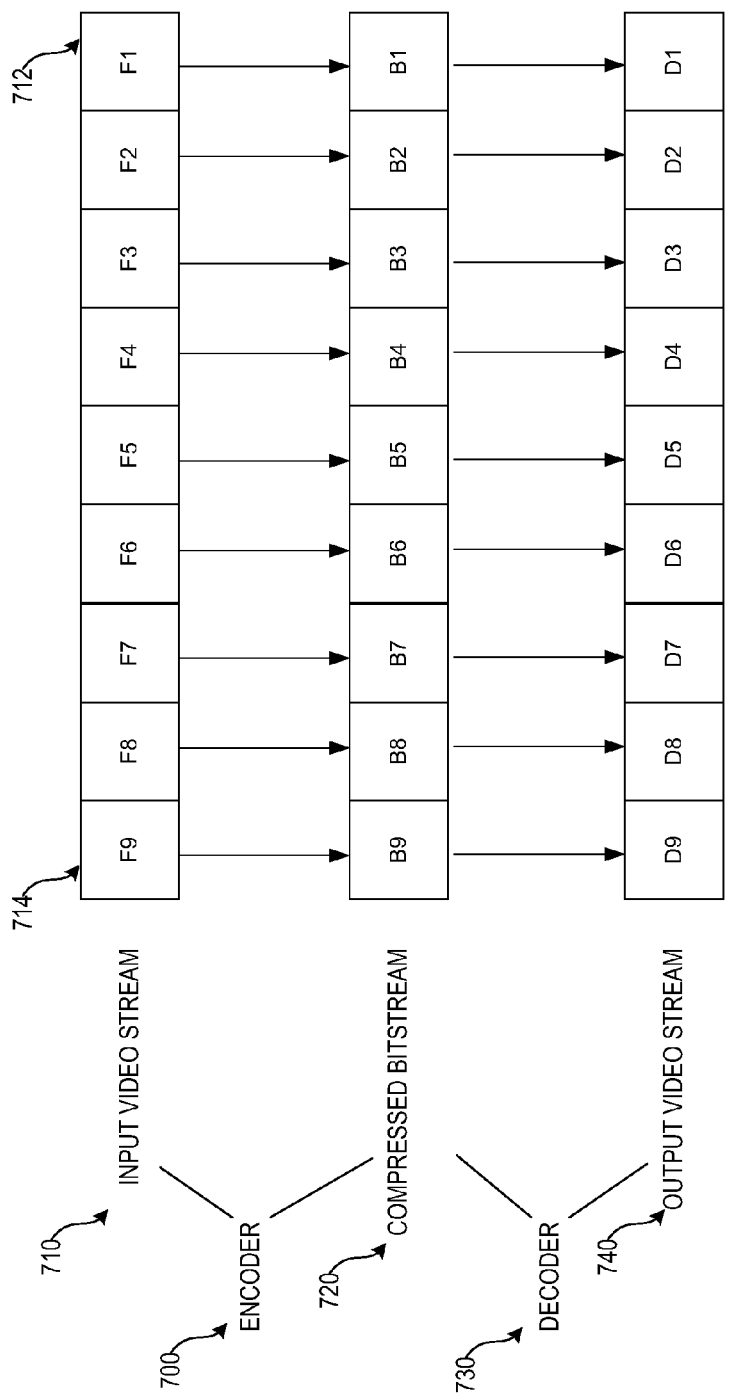
FIG. 7 is a diagram of an example of coding a video stream in accordance with implementations of this disclosure.

FIG. 7 is a diagram of an example of coding a video stream in accordance with implementations of this disclosure. In some implementations, an encoder 700, such as the encoder 400 shown in FIG. 4, may receive an input video stream 710, such as the input video stream 402 shown in FIG. 4, which may include a sequence of temporally adjacent frames. In some implementations, the encoder 700 may receive the sequence of temporally adjacent frames in temporal order F1-F9, wherein a frame position F1-F9 associated with each frame may indicate a temporal location of the frame in the sequence of temporally adjacent frames. For example, the frame 712 associated with the first frame position F1 may be received first and the frame 714 associated with the last frame position F9 may be received last. Although FIG. 7 shows a sequence of temporally adjacent frames including nine frames, a sequence of temporally adjacent frames may include any number of frames. In some implementations, a frame may be included in more than one sequence of temporally adjacent frames. For example, a first sequence of temporally adjacent frames may include the frames associated with the first five frame positions F1-F5, and the last frame in the first sequence of temporally adjacent frames may be the first frame in a second sequence of temporally adjacent frames, which may include the last five frame positions F5-F9 shown. In some implementations, the frame position may be indicated explicitly in the input video stream. For example, the frame position may be indicated by a frame identifier or a time stamp. In some implementations, the frame position may be indicated implicitly based on the relative location of frames in the input video sequence 710.

In some implementations, encoding a video stream may include generating an encoded frame corresponding to each input frame in the input video stream 710 and including each encoded frame in a compressed bitstream 720, such as the compressed bitstream 404 shown in FIG. 4 or the compressed bitstream 502 shown in FIG. 5, in a bitstream order. For example, each encoded frame included in the compressed bitstream 720 may be associated with a bitstream position B1-B9, wherein the bitstream position indicates a location, or position, of the encoded frame in the compressed bitstream 720. In some implementations, the bitstream position may be indicated explicitly in the compressed bitstream 720. For example, the bitstream position may be indicated by an encoded frame identifier or a time stamp. In some implementations, the bitstream position may be indicated implicitly based on the relative location of encoded frames in the compressed bitstream 720. In some implementations, the frame position of the input frame corresponding to an encoded frame may be indicated in the compressed bitstream 720.

In some implementations, the position of an input frame in the sequence of temporally adjacent frames may correspond with the position of a corresponding encoded frame in the compressed bitstream 720. For example, an input frame may be associated with a first frame position F1 and an encoded frame generated for the input frame may be associated with a first bitstream position B1.

In some implementations, one or more of the encoded frames may be generated as a keyframe and a reconstructed frame generated from the keyframe may be used as a reference frame for encoding other frames. For example, the first encoded frame, may be associated with the first frame position F1, and may be generated as a keyframe. In some implementations, a keyframe may be an intra-coded frame. For example, a keyframe may be generated independently, without reference to another frame. For clarity, a reference frame generated from a keyframe may be referred to as a keyframe reference frame. In some implementations, a keyframe may be a relatively high quality encoded frame, and the resource utilization, such as memory utilization and transmission bandwidth utilization, for a keyframe may be relatively high. In some implementations, generating a keyframe may include generating a keyframe reference frame, and storing the keyframe reference frame in a memory, such as a reference frame buffer.

In some implementations, a keyframe may be generated to improve compression performance or to limit random access latency. For example, the input video sequence 710 may include relatively high inter-frame differences, such as where the input video sequence 710 captures a scene change, and a keyframe generated for the first frame after the scene change may be used as a reference frame for inter-coding frames after the keyframe in the sequence of temporally adjacent frames. In some implementations, the random access latency for a video stream may be inversely proportional to the number of keyframes included in the video stream. For example, increasing the number of keyframes generated for a video stream may decrease the latency for accessing an arbitrary point in the video.

In some implementations, one or more of the encoded frames may be generated as an inter-coded frame, with reference to a reference frame, which may be a previously encoded, decoded, and reconstructed frame, and may be stored in a reference frame buffer. For example, the frames associated with frame positions F2-F9 may be encoded with reference to a keyframe reference frame generated from the encoded frame associated with bitstream position B1. In some implementations, a reference frame may be generated based on an inter-coded frame and may be used for encoding a subsequent frame in the sequence of temporally adjacent frames. In some implementations, one or more of the frames in the sequence of temporally adjacent frames may be inter-coded using a last frame reference frame, which may be a reference frame generated from a previously encoded, decoded, and reconstructed frame corresponding to a frame preceding the current frame. For example, the frame associated with the third frame position F3 may be inter-coded based on a reference frame generated from the encoded frame associated with the second bitstream position B2, and the frame associated with the fourth frame position F4 may be coded based on a reference frame generated from the encoded frame associated with the third bitstream position B3. In some implementations, encoding a frame may include identifying a reference frame for encoding the frame. For example, the frame associated with the third frame position F3 may be encoded based on the last reference frame, which may correspond with the encoded frame associated with the second bitstream position B2, or the third frame position F3 may be encoded based on the keyframe reference frame, which may be associated with the first bitstream position B1. In some implementations, a frame may be encoded based on a combination of reference frames.

In some implementations, generating an encoded frame may include using a coding context, which may indicate coding parameters for encoding the frame. In some implementations, a coding context may be associated with a reference frame. In some implementations, generating a keyframe, may include using a coding context that is not associated with another frame. In some implementations, using a coding context that is not associated with another frame may include using a coding context that includes default coding parameters. In some implementations, generating a keyframe may include resetting one or more coding contexts. For example, resetting a coding context may include removing coding parameters associated with a reference frame from the coding context and including default coding parameters in the coding context.

In some implementations, a decoder 730, such as the decoder 500 shown in FIG. 5, may receive the compressed bitstream 720, may generate decoded frames from the encoded frames, and may include the decoded frames in an output video stream 740, such as the output video stream 504 shown in FIG. 5, in an output, or display, position, D1-D9 which may indicate a location, or position, of the decoded frame in the output video stream 740. For example, the frame associated with the first bitstream position B1 may decoded and the corresponding decoded frame may be included in the output video stream 740 at output position D1.

Figure 8:
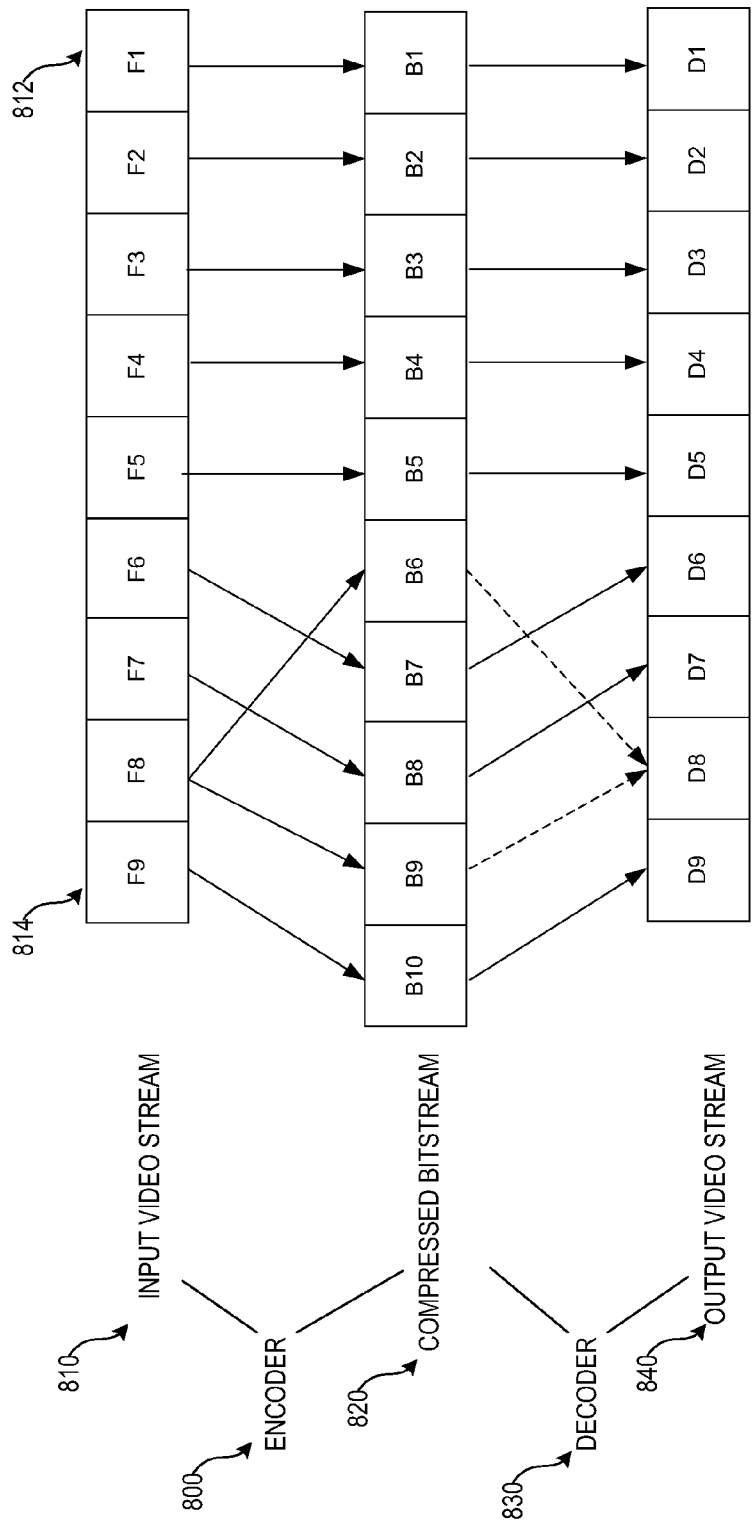
FIG. 8 is a diagram of an example of coding a video stream using advance coded reference prediction in accordance with implementations of this disclosure.

FIG. 8 is a diagram of an example of encoding a video stream using advance coded reference prediction in accordance with implementations of this disclosure. In some implementations, an encoder 800, such as the encoder 400 shown in FIG. 4, may receive an input video stream 810, which may include a sequence of temporally adjacent frames, such as the sequence of temporally adjacent frames shown in FIG. 7. In some implementations, the encoder 800 may receive the sequence of temporally adjacent frames in temporal order F1-F9. For example, the frame 812 associated with the first frame position F1 may be received first and the frame 814 associated with the last frame position F9 may be received last.

In some implementations, the encoder 800 may generate a compressed bitstream 820, such as the compressed bitstream 404 shown in FIG. 4 or the compressed bitstream 502 shown in FIG. 5. For example, the encoder 800 may encode each frame received in the input video stream 810 and may include a corresponding encoded frame in the compressed bitstream 820. In some implementations, each encoded frame included in the compressed bitstream 820 may be associated with a bitstream position B1-B9, which may indicate a location, or position, of the encoded frame in the compressed bitstream 820. For example, the first encoded frame may be associated with the first frame position F1, may be included in the compressed bitstream 820, and may be associated with the first bitstream position B1.

In some implementations, encoding a video stream using advance coded reference prediction may include generating an alternate reference frame. For example, the frame associated with the eighth frame position F8 may be encoded independently, without reference to another frame, may be included in the compressed bitstream 820 at bitstream position B6, and an alternate reference frame may be generated based on the encoded frame. In some implementations, the one or more frames associated with frame positions preceding the frame position associated with the alternate reference frame F8, and associated with bitstream positions after the bitstream position associated with the alternate reference fame B6, such as the frame associate with the sixth frame position F6 and the seventh bitstream position B7 or the frame associate with the seventh frame position F7 and the eight bitstream position B8, may be inter-coded with reference to the alternate reference frame. In some implementations, the one or more frames associated with frame positions following the frame position associated with the alternate reference frame F8, and associated with bitstream positions after the bitstream position associated with the alternate reference fame B6, such as the frame associate with the ninth frame position F9 and the tenth bitstream position B10, may be inter-coded with reference to the alternate reference frame.

In some implementations, encoding a video stream using advance coded reference prediction may include encoding a golden frame group (GFG), which may be a sequence of temporally adjacent frames, wherein a first frame of the group may be encoded as a keyframe, and each successive frame may be encoded with reference to the keyframe or with reference to a previously encoded frame in the GFG. For example, the input frames associated with frame positions F1-F9 may be a GFG, the frame associated with frame position F1 may be a keyframe or golden frame.

In some implementations, encoding a video stream using advance coded reference prediction may include encoding an alternate reference frame group, which may be a sequence of temporally adjacent frames, wherein a last frame of the group may be encoded as an alternate reference frame and as a keyframe in the first bitstream position, and each successive frame of the group may be encoded with reference to a previous keyframe, the alternate reference frame, or a previously encoded frame in the group. For example, the input frames associated with frame positions F6-F8 may be an alternate reference frame group, and the frame associated with frame position F8 may be an alternate reference frame.

In some implementations, generating the compressed bitstream 820 may include indicating that a frame in the compressed bitstream 820 is an alternate reference frame. For example, an alternate reference frame indicator may be included in the compressed bitstream 820 and may indicate that the frame at bitstream position B6 is an alternate reference frame. In some implementations, generating the compressed bitstream 820 may include indicating that a frame in the compressed bitstream 820 is a keyframe. For example, a keyframe indicator may be included in the compressed bitstream 820 and may indicate that the frame at bitstream position B6 is a keyframe. In some implementations, an alternate reference frame indicator and a keyframe indicator may be included in the compressed bitstream 820 and may indicate that the frame at bitstream position B6 is a keyframe and an alternate reference frame. For example, the alternate reference frame indicator, the keyframe indicator, or both, may be included in a frame header.

In some implementations, the encoder 800 may generate an encoded overlay frame for the input frame associated with the frame position associated with the alternate reference frame, and may include the overlay frame in the compressed bitstream in an order corresponding to the frame position of the overlay frame. For example, the encoder 800 may generate an encoded overlay frame for the input frame associated with the frame position F8 associated with the alternate reference frame, and may include the overlay frame in the compressed bitstream at the bitstream position B9. In some implementations, an overlay frame may be a null frame.

In some implementations, generating an encoded frame may include using a coding context, which may indicate coding parameters for encoding the frame. In some implementations, a coding context may be associated with a reference frame. In some implementations, generating an alternate reference frame may include using a coding context that is not associated with another frame. In some implementations, using a coding context that is not associated with another frame may include using a coding context that includes default coding parameters. In some implementations, generating an alternate reference frame may include resetting one or more coding contexts. For example, resetting a coding context may include removing coding parameters associated with a reference frame from the coding context and including default coding parameters in the coding context.

In some implementations, a decoder 830, such as the decoder 500 shown in FIG. 5, may receive the compressed bitstream 820, may generate decoded frames from the encoded frames, and may include the decoded frames in an output video stream 840, such as the output video stream 504 shown in FIG. 5, in an output, or display, position, D1-D9 which may indicate a location, or position, of the decoded frame in the output video stream 840. For example, the frame associated with the first bitstream position B1 may decoded and the corresponding decoded frame may be included in the output video stream 840 at output position D1. In some implementations, the decoder 830 may omit the alternate reference frame from the output video stream at an output position corresponding to the bitstream position of the alternate reference frame.

In some implementations, the decoder 830 may generate a decoded overlay frame for the encoded frame associated with the frame position associated with the alternate reference frame with reference to the alternate reference frame, and may include the overlay frame in the output video stream 840. For example, the decoder 830 may decode an overlay frame associated with the frame position F8 with reference to the alternate reference frame, and may include the overlay frame in the output video stream at the output position D8. In some implementations, generating a decoded overlay frame may include resetting one or more coding contexts and one or more reference frame buffers not associated with the alternate reference frame, and may include updating a coding context and a reference frame buffer associate with the alternate reference frame based on the decoded overlay frame.

In some implementations, the encoder may include an indication of the frame position associated with an alternate reference frame in the compressed bitstream. For example, the encoder may include an indication of a position of an overlay frame in the compressed bitstream relative to the corresponding alternate reference frame. In some implementations, the indication may include an offset indicator associated with the alternate reference frame, which may indicate a number of frames, in frame or byte units, and the decoder may identify the offset indicator associated with the alternate reference frame and may skip a number of frames, or bytes, indicated by the offset indicator to identify a decodable keyframe.

In some implementations, the encoder may include, in the compressed bitstream, an alternate reference frame indicator associated with the alternate reference frame, a keyframe indicator associated with the overlay frame, and an offset indicator associated with the overlay frame, which may indicate a number of frames, in frame or byte units, and the decoder may identify the offset indicator associated with the overlay frame and may back up a number of frames, or bytes, indicated by the offset indicator to identify a decodable keyframe.

Figure 9:
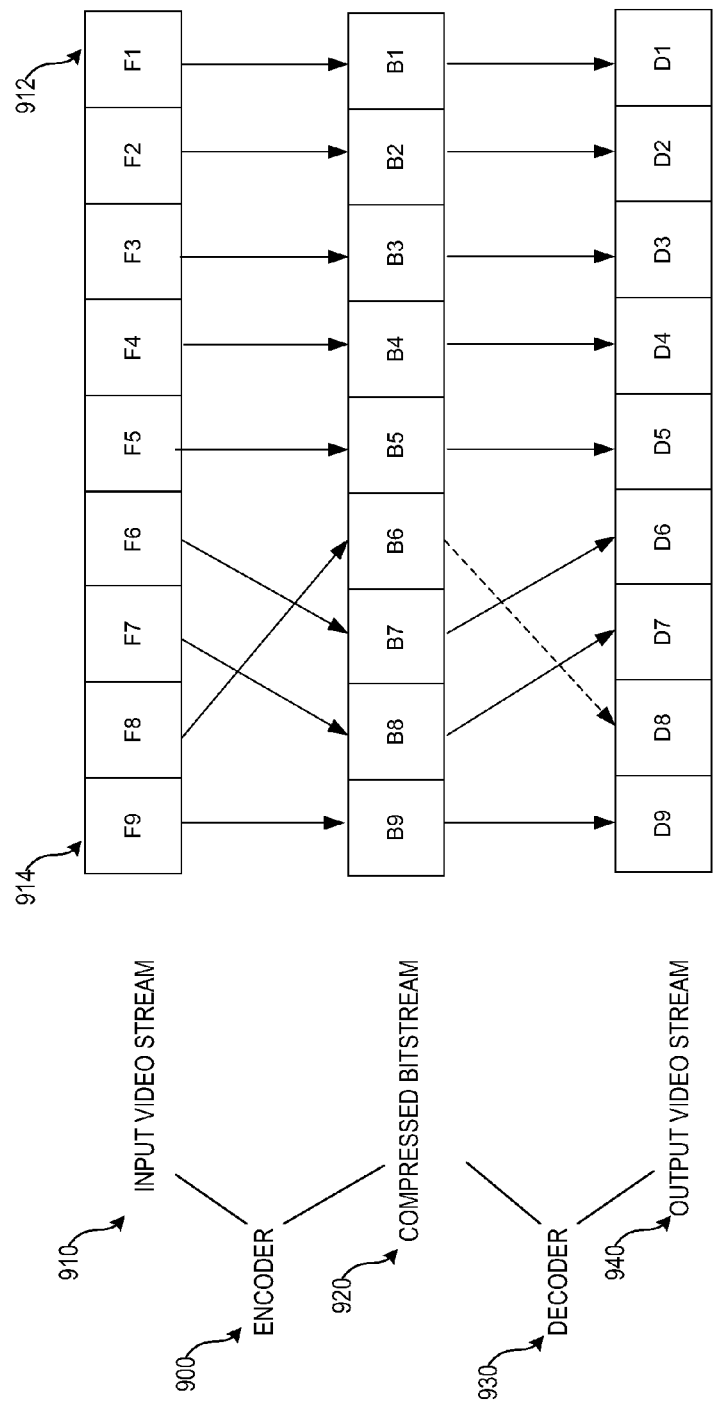
FIG. 9 is a diagram of another example of coding a video stream using advance coded reference prediction in accordance with implementations of this disclosure.

FIG. 9 is a diagram of another example of encoding a video stream using advance coded reference prediction in accordance with implementations of this disclosure. Encoding a video stream using advance coded reference prediction as shown in FIG. 9 may be similar to encoding a video stream using advance coded reference prediction as shown in FIG. 8, except as described herein.

In some implementations, the encoder 900 may encode an input frame, such as the input frame associated with frame position F8 as an alternate reference frame at a bitstream position, such as the sixth bitstream position B6, that is earlier than the frame position, and the encoder 900 may include, in the compressed bitstream 920, an indicator, such as a frame skip indicator, which may indicate an instruction that the alternate reference fame may be included in an output video stream at a position corresponding with the frame position associated with the alternate reference frame. For example, the encoded frame at bitstream position B6 may be an alternate referenced frame associated with frame position F8, the compressed bitstream may include a frame skip flag indicating the alternate reference frame, and the decoded frame generated based on the encoded frame at bitstream position B6 may be included in the output.

In some implementations, the decoder may 930 may identify a frame skip indicator associated with an alternate reference frame in the compressed bitstream 920, and may include the alternate reference frame in the output video stream 940 at an output position corresponding to the frame position associated with the alternate reference frame.

Other implementations of the diagrams of advance coded reference prediction as shown in FIGS. 6-9 are available. In implementations, additional elements of advance coded reference prediction can be added, certain elements can be combined, and/or certain elements can be removed. For example, generating an overlay frame may be omitted and a frame skip indicator may be included in the compressed bitstream.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream including a plurality of frames, the method comprising:
   identifying a sequence of temporally adjacent frames from the plurality of frames, wherein each frame in the sequence of temporally adjacent frames is associated with a respective frame position indicating a temporal location of the respective frame in the sequence of temporally adjacent frames;
   generating a first encoded frame by encoding a first frame from the sequence of temporally adjacent frames as an intra-coded frame, the first frame associated with a first frame position;
   generating a first alternate reference frame by reconstructing the first encoded frame; generating a second encoded frame by encoding a second frame from the sequence of temporally adjacent frames with reference to at least one of a plurality of reference frames, the second frame associated with a second frame position, wherein the plurality of reference frames includes the first alternate reference frame;
   including the first encoded frame in a compressed bitstream at a first bitstream position in the compressed bitstream, wherein including the first encoded frame in the compressed bitstream includes:
     including an indication that the first encoded frame is an alternate reference frame in the compressed bitstream, and
     including an indication that the first encoded frame is a keyframe in the compressed bitstream; and
   including the second encoded frame in the compressed bitstream at a second bitstream position in the compressed bitstream, wherein the second bitstream position in the compressed bitstream is later than the first bitstream position in the compressed bitstream and wherein the first frame position is later than the second frame position.

2. The method of claim 1, wherein generating the first alternate reference frame includes storing the first alternate reference frame in a reference frame buffer.

3. The method of claim 1, wherein the first frame is the last frame in the sequence of temporally adjacent frames.

4. The method of claim 1, wherein the first encoded frame is the first frame in the compressed bitstream.

5. The method of claim 1, further comprising:
   generating a second reference frame based on the first alternate reference frame;
   generating a third encoded frame by encoding a third frame from the sequence of temporally adjacent frames with reference to the second reference frame, the third frame associated with a third frame position; and
   including the third encoded frame in the compressed bitstream at a third bitstream position in the compressed bitstream, wherein the third bitstream position in the compressed bitstream is later than the second bitstream position in the compressed bitstream and wherein the third frame position is later than the first frame position.

6. The method of claim 1, further comprising:
   generating an encoded overlay frame by encoding the first frame from the sequence of temporally adjacent frames with reference to the first alternate reference frame; and
   including the encoded overlay frame in the compressed bitstream at a third bitstream position in the compressed bitstream, wherein the third bitstream position in the compressed bitstream is later than the second bitstream position in the compressed bitstream.

7. The method of claim 1, further comprising:
   including a frame skip indicator in the compressed bitstream at a bitstream position corresponding to the frame position associated with the first alternate reference frame, the frame skip indicator indicating an instruction to include a decoded frame generated from the first alternate reference frame in an output video stream at an output position corresponding to the frame position.

8. A method for decoding a video stream including a plurality of encoded frames, the method comprising:
   receiving at least a portion of the video stream, wherein each encoded frame in the plurality of encoded frames is associated with a respective bitstream position indicating a position of the respective encoded frame in the compressed bitstream, and wherein the compressed bitstream represents a sequence of temporally adjacent video frames, wherein each frame in the sequence of temporally adjacent video frames is associated with a respective frame position indicating a temporal location of the respective frame in the sequence of temporally adjacent video frames;
   identifying a first encoded frame from the plurality of encoded frames, the first encoded frame associated with a first bitstream position, wherein identifying the first encoded frame from the compressed bitstream includes:
     identifying an indication that the first encoded frame is an alternate reference frame from the compressed bitstream, and
     identifying an indication that the first encoded frame is a keyframe from the compressed bitstream;
   generating a first alternate reference frame by decoding the first encoded frame as an intra-coded frame, wherein the first alternate reference frame is associated with a first frame position;
   identifying a second encoded frame from the plurality of encoded frames, the second encoded frame associated with a second bitstream position, wherein the second bitstream position is later than the first bitstream position;
   generating a first decoded frame by decoding the second encoded frame with reference to at least one of a plurality of reference frames, the first decoded frame associated with a second frame position, wherein the plurality of reference frames includes the first alternate reference frame;
   identifying a third encoded frame from the plurality of encoded frames, the third encoded frame associated with a third bitstream position, wherein the third bitstream position is later than the second bitstream position;

generating a second decoded frame by decoding the third encoded frame with reference to the first alternate reference frame, wherein the second decoded frame is associated with the first frame position;

including the first decoded frame in an output video stream at a first output position; and including the second decoded frame in the output video stream at a second output position, wherein the second output position is later than the first output position, and wherein the first frame position is later than the second frame position.

9. The method of claim 8, wherein generating the first alternate reference frame includes storing the first alternate reference frame in a reference frame buffer.

10. The method of claim 8, wherein the first frame position indicates the last temporal location in the sequence of temporally adjacent video frames.

11. The method of claim 8, further comprising:
identifying a fourth encoded frame from the plurality of encoded frames, the fourth encoded frame associated with a fourth bitstream position, wherein the first bitstream position is later than the fourth bitstream position;

generating a third decoded frame by decoding the fourth encoded frame with reference to the reference frame, wherein the third decoded frame is associated with a third frame position; and including the third decoded frame in the output video stream at a third output position, wherein the first output position is later than the third output position, and wherein the second frame position is later than the third frame position.

12. The method of claim 11, wherein the first output position is immediately after the third output position and the second frame position is immediately after the third frame position.

13. The method of claim 8, wherein the second decoded frame is an overlay frame.

14. The method of claim 8, wherein decoding the third encoded frame with reference to the first alternate reference frame includes:
identifying a first coding context associated with the first alternate reference frame;
identifying a first reference frame buffer including the first alternate reference frame; identifying the second decoded frame as a new reference frame;
updating the first coding context based on the second decoded frame;
replacing the first alternate reference frame in the first reference frame buffer with the second decoded frame;
resetting a plurality of coding contexts other than the first coding context; and
resetting a plurality of reference frame buffers other than the first reference frame buffer.

15. The method of claim 14, further comprising
identifying a fourth encoded frame from the plurality of encoded frames, the fourth encoded frame associated with a fourth bitstream position, wherein the fourth bitstream position is later than the first bitstream position;

generating a third decoded frame by decoding the fourth encoded frame with reference to the new reference frame, wherein the third decoded frame is associated with a third frame position; and including the third decoded frame in the output video stream at a third output position, wherein the third output position is later than the second output position, and wherein the third frame position is later than the first frame position.

16. A method for decoding a video stream including a plurality of encoded frames, the method comprising:
receiving at least a portion of the video stream, wherein each encoded frame in the plurality of encoded frames is associated with a respective bitstream position indicating a position of the respective encoded frame in the compressed bitstream, and wherein the compressed bitstream represents a sequence of temporally adjacent video frames, wherein each frame in the sequence of temporally adjacent video frames is associated with a respective frame position indicating a temporal location of the respective frame in the sequence of temporally adjacent video frames;

identifying a first encoded frame from the plurality of encoded frames, the first encoded frame associated with a first bitstream position, wherein including the first encoded frame in the compressed bitstream includes:
including an indication that the first encoded frame is an alternate reference frame in the compressed bitstream, and
including an indication that the first encoded frame is a keyframe in the compressed bitstream;

generating a first alternate reference frame by decoding the first encoded frame as an intra-coded frame, wherein the first alternate reference frame is associated with a first frame position;

identifying a second encoded frame from the plurality of encoded frames, the second encoded frame associated with a second bitstream position, wherein the second bitstream position is later than the first bitstream position;

generating a first decoded frame by decoding the second encoded frame with reference to at least one of a plurality of reference frames, the first decoded frame associated with a second frame position, wherein the plurality of reference frames includes the first alternate reference frame;

identifying, in the compressed bitstream, a frame skip indicator associated with the first frame position;

including the first decoded frame in an output video stream at a first output position; and including the first alternate reference frame in the output video stream at a second output position, wherein the second output position is later than the first output position, and wherein the first frame position is later than the second frame position.

* * * * *